(12) United States Patent
Neuberger

(10) Patent No.: US 6,975,791 B2
(45) Date of Patent: Dec. 13, 2005

(54) FIBER LASER PUMPING DEVICE

(75) Inventor: Wolfgang Neuberger, Labuan (MY)

(73) Assignee: CeramOptec Industries, Inc., East Longmeadow, MA (US)

(*) Notice: Subject to any disclaimer, the term of this patent is extended or adjusted under 35 U.S.C. 154(b) by 111 days.

(21) Appl. No.: 10/202,990

(22) Filed: Jul. 25, 2002

(65) Prior Publication Data

US 2004/0017968 A1    Jan. 29, 2004

(51) Int. Cl.$^7$ .......................... G02B 6/26; H01S 3/091; H01S 3/067; H04B 10/12
(52) U.S. Cl. .............................. 385/27; 372/6; 372/70; 359/341.1; 359/341.3
(58) Field of Search .......................... 359/341.1, 341.3, 359/341.33; 385/27, 31, 32; 372/6, 70

(56) References Cited

U.S. PATENT DOCUMENTS

| | | |
|---|---|---|
| 4,815,079 A | 3/1989 | Snitzer et al. |
| 4,829,529 A | 5/1989 | Kafka |
| 5,761,227 A * | 6/1998 | Hargis et al. ................. 372/22 |
| 5,854,865 A | 12/1998 | Goldberg |
| 5,923,694 A | 7/1999 | Culver |
| 6,229,939 B1 * | 5/2001 | Komine ........................ 385/29 |
| 6,243,515 B1 | 6/2001 | Heflinger et al. |
| 6,275,512 B1 * | 8/2001 | Fermann ........................ 372/6 |
| 6,603,905 B1 * | 8/2003 | Ionov ........................... 385/39 |
| 6,704,476 B2 * | 3/2004 | Ford et al. .................... 385/18 |
| 6,879,435 B2 * | 4/2005 | Rice ........................ 359/341.1 |

* cited by examiner

Primary Examiner—Rodney Bovernick
Assistant Examiner—Omar Rojas
(74) Attorney, Agent, or Firm—B J Associates; Bolesh J. Skutnik; Stanton E. Collier

(57) ABSTRACT

An improved device and method to pump fiber lasers in order to enhance performance and reliability is provided. A fiber laser is bent into a coil having a moderate curvature so as to avoid radiation losses. A cladding is partly polished to produce coupling surfaces along the length of the spring-like coil. Radiation emitters are imaged with one or more micro lenses that are attached to the coupling surface. In a preferred embodiment, banks of high power laser diodes are utilized as pump sources. Coupling surfaces are preferably created along the length of the fiber at intervals where pump radiation from the previous pump edge has been absorbed. Although the system may be used to pump single mode fibers, the preferred application is to pump multimode fibers, having greater core diameters and higher luminescent capacity, wherein only a single cladding can be used. When a core dopant is included that can convert infrared to visible wavelengths, the device is particularly useful as a light source for homogeneously illuminated and partially illuminated fibers that diffuse light along their lengths.

12 Claims, 3 Drawing Sheets

(Prior Art)

FIBER LASER PUMPING DEVICE

BACKGROUND OF THE INVENTION

1. Field of the Invention

The present invention relates to fiber lasers and more particularly to a method and device for pumping a fiber laser.

2. Information Disclosure Statement

The radiation emitted by a laser beam source can be coupled into an optical fiber of suitable dimensions and optical properties wherein light can be transported with no significant loss over very long distances. Today's state of the art optical fibers have found broad application in the fields of telecommunication, optical inspection, medical therapy, laser applications and many more.

Since it is possible to couple into optical fibers the radiation of high power light sources, such as diodes and laser beams, one can envision producing specially manufactured illuminated fibers for a wide variety of applications. Gallery lighting for sensitive artwork is an excellent candidate for a system with reduced risk of electrical fires. Emergency illumination systems for aircraft, trains, boats, swimming pools, and other areas where standard electric wire-based illumination would be undesirable is another application. Such applications require a significant illumination source. The problem of obtaining a sufficient illumination source for such demanding applications can be solved in an elegant way by the application of a fiber laser.

A fiber laser generally consists of a fiber core that is doped with a laser active material, an undoped inner cladding, which is sometimes referred to as the pumping 'core', and an outer cladding to maintain the wave-guiding effects of the inner cladding. FIG. 1 illustrates such a conventional fiber laser, which is end pumped into the inner cladding. It consists of fiber core 102, inner cladding 104 and outer cladding 106. The laser active material, also known as a gain medium, within fiber core 102 is typically a rare earth element, such as Erbium, Neodymium, Ytterbium, Holmium, Europium, and Samarium. A radiation source pumps radiation into doped core 102 through outer cladding 106. The laser active material in core 102 absorbs the pump radiation and reemits light in another wavelength from an electronic transition. A portion of this light is emitted in the direction of fiber core 102 and guided therein. Multimode inner cladding 104 acts as a pump cavity around laser core 102 to couple radiation to the gain medium. The radiation entering multimode inner cladding 104 totally internally reflects the pump radiation so that it passes through core 102 many times to effectively pump the laser. Outer cladding 106 prevents light from propagating out of inner cladding 104. Outer cladding 106 is usually made of polymer material or low index glass.

If the two fiber ends are coated in a suitable manner, for example one with a predefined degree of reflection, so a part of the light can couple out to form the laser beam and the other one coated to be highly reflective for the laser wavelength, laser action is possible in fiber core 102. Bragg gratings may also be used at the two ends of a fiber to accomplish the required effect.

An important consideration is to have the energy of the pumping light source concentrated at the absorption bands of the dopant materials being used. In order to produce an inversion of population in the laser material, the light source must have sufficient energy at the absorption bands of the dopant material.

Preferably, fiber core 102 and its claddings are designed so that only a single mode can propagate therein. Inner cladding 104 surrounding fiber core 102 has a lower index of refraction than core 102. Outer cladding 106 has an even lower index of refraction and forms an outer fiber itself surrounding inner cladding 104. Outer cladding 106 may also serve as the protective coating for the fiber. Radiation 108 is coupled into this so-called outer fiber, exciting the dopant in inner core 102, thus pumping the laser.

The pump-radiation is coupled into inner cladding 104 and is guided therein. It causes the necessary inversion over the fiber length. Fiber core 102 is designed in order to propagate the single mode only. The pumping process drives this mode, so if the endfaces of the fiber are polished and suitably coated, a laser action operation starts. Due to the homogeneous pumping method the intensity of the laser mode is equal along the fiber. Generally, the radiation of today's fiber lasers has a wavelength around 1.3–1.5 microns.

To utilize fiber lasers for illuminated fibers, at least two changes have to be applied to the state of the art concepts. The radiation must be made visible and the pumping mechanism must be improved to provide greater quantities of light.

If the fiber core is pumped directly from the side or its end, a second cladding may not be necessary. This would especially be true where the doped core is a multimode core. Multimode cores also have greater illuminating capacity than single mode cores, and are preferred in the applications considered for the present invention. Since multimode fibers must be pumped harder than a single mode fiber, high power laser diode sources are frequently used as the pump source. The use of laser diodes as a pump light source is advantageous due to the relatively high power of the laser light. A concern when using laser diodes as a pump source is that laser diodes do not emit rotationally symmetrical radiation. The angle of dispersion in the region parallel to the mounting surface is smaller than that of the perpendicular region. The light beam does not diverge as quickly in the direction parallel to the mounting surface compared to the divergence of the beam in the direction perpendicular to the surface. If an optical system, such as a lens, is not used to focus the light energy, part of the energy will not be coupled into the fiber and will be lost.

U.S. Pat. No. 4,815,079 describes an apparatus for coupling radiation into a single-mode core of an optical fiber, having a multimode cladding and an outer layer to prevent radiation from propagating out of the cladding. The single-mode core is disposed at an offset from the geometric center of the multimode cladding. In a side pumped preferred embodiment, a portion of the cladding is exposed and a prism or tapered wedge is affixed to the exposed portion of the cladding. Radiation, which impinges upon the face of the wedge, is coupled into the cladding. The use of multiple wedges or prisms is also disclosed. The patent restricts itself to substantially single-mode cores. There are no means described for a compact configuration or pump source to provide radiation to multiple coupling sites simultaneously.

U.S. Pat. No. 4,829,529 describes a fiber laser pumped by a high power laser diode source using a multimode fiber cavity around a single mode laser core. Pump radiation is input into the multimode fiber that totally internally reflects the pump radiation through the single mode core to effectively pump the laser. The multimode mode fiber has a much larger diameter than the single mode core and is a better target for end pumping. The invention is limited to end pumping with a single pump source to power a single mode core.

U.S. Pat. No. 5,854,865 describes a technique for coupling pump light into a fiber by injecting light through the side of a fiber. The technique relies on the fabrication of at least one groove or micro prism into the side of the fiber. A lighting means is placed on the opposite side of the fiber in close proximity to the fiber wall. Light propagates laterally through the fiber and impinges on the sides of the groove where it is reflected and directed along the horizontal axis. The use of multiple grooves along the length of the fiber is discussed. In the embodiments described, the groove extends into both the outer and inner claddings. Grooves extending into the inner cladding weaken the fiber, degrade reliability, and limit the ability of the fiber to be wound into a compact coil. If the fiber were placed in a coil configuration, light sources would have to be positioned in the center of the coil. This would be an awkward and expensive assembly.

U.S. Pat. No. 5,923,694 describes a pumped fiber laser including turns of optical fiber defining a wound pack. A fiber core with cladding is surrounded by a porous glass matrix material. A wedge device connected to the fiber directs light from a pumping laser into the side of the optical fiber at a plurality of different turns of the wound pack. The wedge device only directs light onto the surface of the cladding and does not focus or concentrate the laser light into the individual windings.

U.S. Pat. No. 6,229,939 describes a high power diode-pumped single-mode fiber ribbon laser having a rectangular shaped core. The ribbon contains a plurality of parallel wave-guides and mode filters to propagate a desired single-mode. Each of the cores in the ribbon is optically pumped from the side by a bar of diode arrays. In a preferred embodiment, the ribbon is wrapped around a mandrel. The described invention is limited to single mode fibers having a terminal output, and would not be practical for a multimode fiber having illuminating properties.

U.S. Pat. No. 6,243,515 describes an apparatus for optically pumping an optical fiber from the side. The apparatus comprises a grating formed on the longitudinal surface of a multimode fiber. A beam of pump light is passed through the fiber at a region where the outer cladding has been removed. The grating on the opposite surface causes the light to be diffracted at an angle that matches the propagation angle. Pump light passing through a doped central core causes the media to be optically excited. Removing the entire outer cladding from a region of the optical fiber can significantly weaken the fiber and decrease reliability. Pumping the fiber from the side opposite the grating makes it difficult to use the technique on anything but a relatively linear fiber. Compact configurations, such as coils, are prohibited or at least difficult to arrange.

To effectively use optical fibers as illumination sources a compact fiber laser pumping device capable of transferring high-energy radiation is desirable. There still exists a need for a fiber laser-pumping device that can couple light in an efficient manner and that is economical to manufacture.

OBJECTIVES AND BRIEF SUMMARY OF THE INVENTION

An object of the present invention is to improve the performance of fiber lasers by novel pumping methods.

Another object of the present invention is to provide an improved side pumped fiber laser in the form of a coil.

Yet another object of the present invention is to pump a fiber laser along a single edge of a coiled structure in order to utilize a compact radiation source.

A further object of the present invention is to provide an improved pumped fiber laser particularly suited for use with illuminating fibers.

Still another object of the present invention is to convert radiation from the infrared to the visible using a fiber laser.

Briefly stated, the present invention provides an improved method and device to pump fiber lasers in order to enhance performance and reliability. A fiber laser is bent into a coil having a moderate curvature so as to avoid radiation losses. An outer cladding is partly polished to produce coupling surfaces on an inner cladding along the length of the spring-like coil. Radiation emitters are imaged with part of a micro lens that is attached to the coupling surface. In a preferred embodiment, banks of high power laser diodes are utilized as pump sources. Coupling surfaces are preferably created along the length of the fiber at intervals where pump radiation from the previous pump edge has been absorbed. Although the invention may be used to pump single mode fibers, the preferred application is to pump multimode fibers, having greater core diameters and higher luminescent capacity, wherein only a single cladding can be used. When a core dopant is included that converts infrared to visible wavelengths, the device is particularly useful as a light source for homogeneously illuminated and partially illuminated fibers that diffuse light along their lengths.

The above and other objects, features and advantages of the present invention will become apparent from the following description read in conjunction with the accompanying drawings

DETAILED DESCRIPTION OF PREFERRED EMBODIMENTS

Fiber lasers usually operate in the infrared wavelength, therefore some means to convert to visible radiation is necessary. Frequency conversion is such a means. The frequency converted radiation can either be directly scattered, by implanted frequency converting particles in varying concentrations in order to achieve the structured illumination, or be guided in the core together with the fundamental radiation and then be scattered by a suitable device. An example is transfer radiation of an Erbium fiber laser from about 1.5 micrometer to 0.75 micrometer, which is visible.

Since the first mentioned method avoids any influence of scattering means to the radiation at fundamental wavelength, the laser performance can be optimized and is higher than with any other method. Since the radiation intensity in fiber lasers is high, attributed to the small core size, frequency conversion processes are very effective because the power density is high.

Generally, fibers of only several meters are required in fiber lasers to get sufficient output. For certain applications, such as fibers used for illumination, the conventional lengths of the fiber laser sources will not be sufficient. Maintaining a homogeneous illumination along these longer fibers will require new pumping methods. The present invention provides a method to improve the general performance of fiber lasers by coupling pump-radiation along the fiber rather than only at the fiber end.

Figure 1:
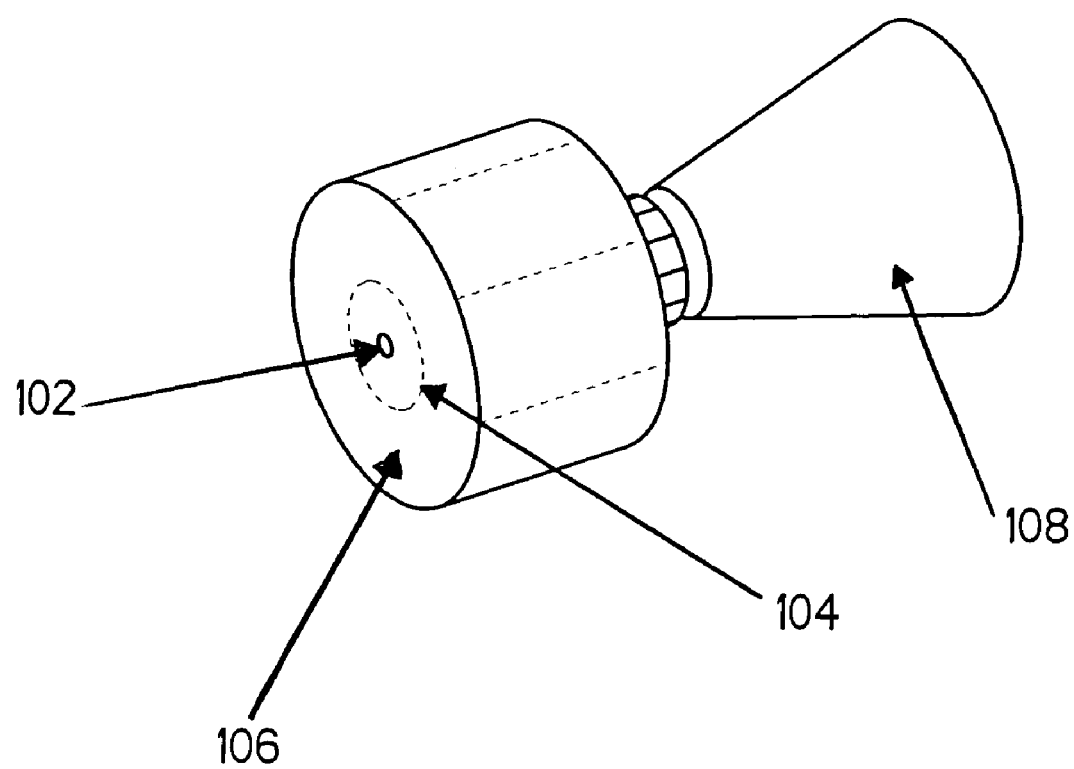
FIG. 1 illustrates a conventional fiber laser as known in the art.
Figure 2:
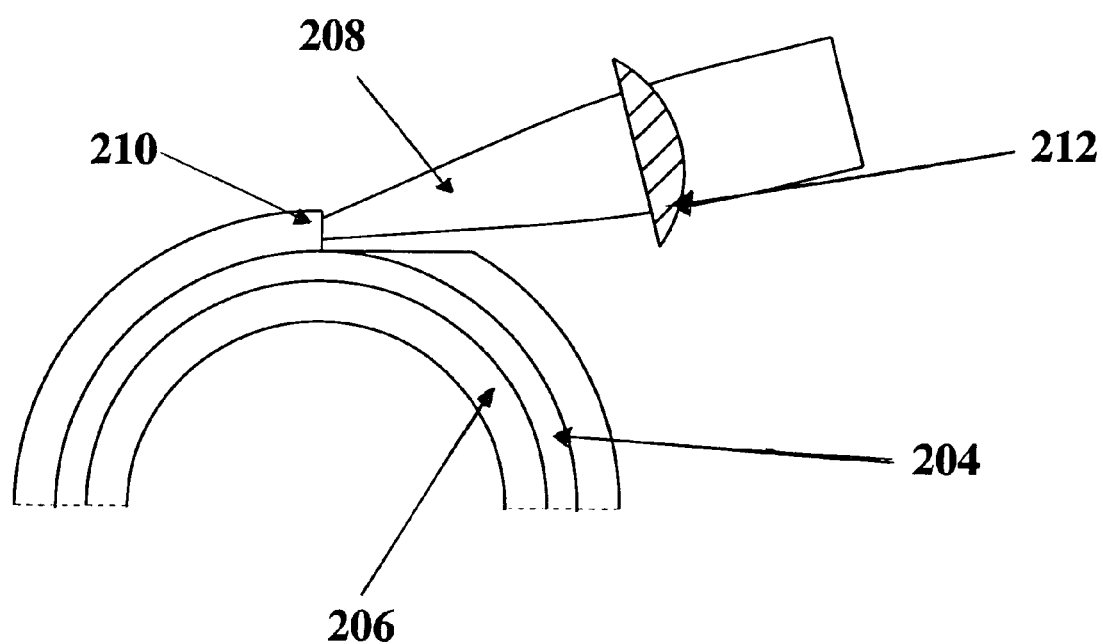
FIG. 2 illustrates the pumping scheme of the present invention.

FIG. 2 illustrates the principle of the pumping scheme that is the subject of the present invention. A fiber laser is bent in a curvature that is sufficiently moderate so as not to induce any radiation losses. In this bend secondary cladding 206 is partly polished without affecting secondary core 204 (which consists of the fiber core surrounded by the primary cladding). The result is coupling surface 210, which has a height of about half the size of the secondary fiber diameter. Pump radiation 208 with suitable beam characteristics can be coupled into the fiber at coupling surface 210 with optical system 212. Since secondary core 204 is unaffected, pump radiation 208 is not altered. Edge pumping of this type should be included at each point along the curvature where the pump radiation from the previous coupling surface has been fully absorbed. This method makes it possible to increase the performance of fiber lasers in general, and in particular, for fiber lasers used to source illuminating fibers. Suitable pump sources are fiber coupled diode lasers.

In another preferred embodiment of the present invention, secondary (outermost) 'cladding' 206 is simply a protective coating. Protective coating 206 and part of the primary cladding are polished to produce the coupling surface. Pump radiation 208 with suitable beam characteristics can be coupled into the fiber at the coupling surface with optical system 212. Since the primary cladding is modified in this embodiment, pump radiation 208 is typically altered in the fiber, but the radiation intensity will be significantly stronger than standard end pumping.

Figure 3:
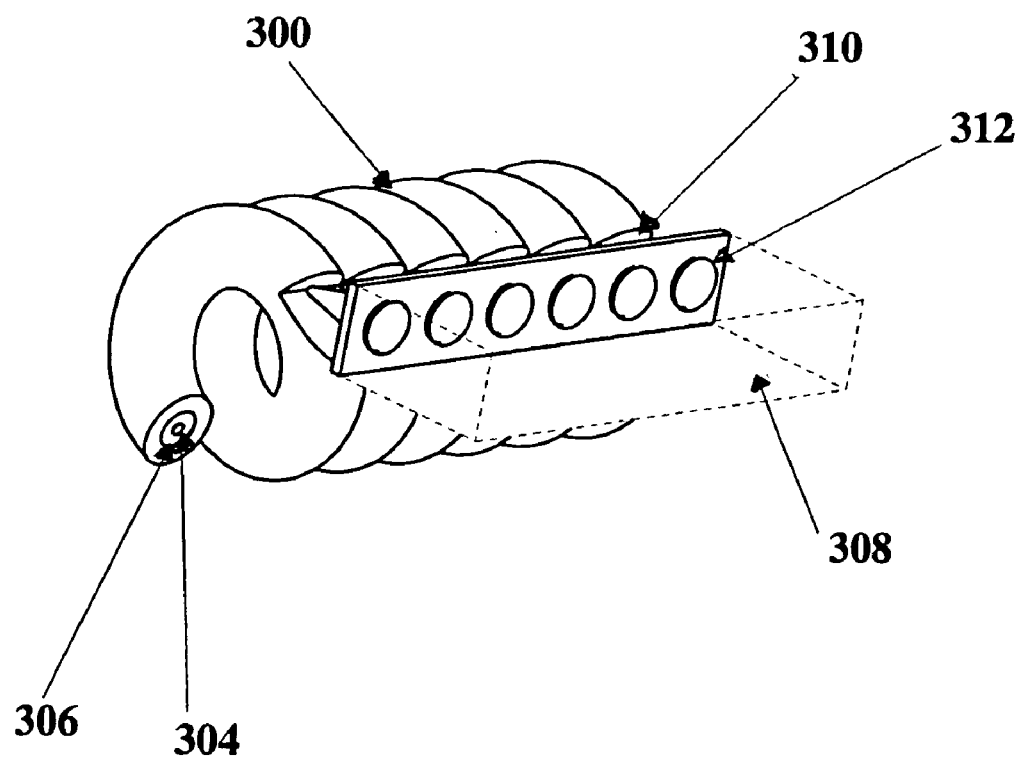
FIG. 3 shows a preferred embodiment of the invention using a bank of diode lasers as pump sources.

The present invention is further illustrated by the following example, but is not limited thereby:

In a preferred embodiment of the present invention, illustrated in FIG. 3, the direct application of diode lasers as pump sources is realized. A secondary fiber (consisting of secondary cladding 306 primary cladding 304 and fiber core) is bent to form fiber laser coil 300 with a well-defined separation between the single bends. A spacing support (not shown) may be placed inside fiber laser coil 300 for coil separation and support. Coupling edge 310 is polished along the whole spring-like structure. Radiation 308 generated by high power diode lasers (not shown) is of a line type, i.e. the laser emitters are arranged in a line and the beam profile takes this line shape. Each single emitter is imaged with a suitable part of micro-lens 312 on exactly one pump edge of fiber laser coil 300 and coupled in separately. This is much easier than shaping the laser radiation to a spot and then coupling it into a fiber completely in one step, attributed to the excellent beam properties of each single emitter of the fiber in opposite to the unfavorable beam characteristics of the whole radiation line.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A side pumped fiber laser device comprising a round core containing a laser active substance and a cladding around said core, a pump radiation source, and a means to couple radiation from said radiation source to said core and cladding, wherein said core is multimode;

said fiber laser is wound to form a spring-like coil having well defined separation between single bends, said cladding is partly polished to form a coupling surface adjacent to a pump edge on said cladding, and said means to couple said radiation from said radiation source is an optical system and wherein said pump radiation source is an inline set of high power diode lasers which simultaneously provide pump-radiation at subsequent bends along said coil.

2. The side pumped fiber laser device according to claim 1 wherein said optical system is a micro-lens which images at least one diode laser onto exactly one said pump edge of said fiber laser coil and said diode lasers being on at least one diode bar.

3. The side pumped fiber laser device according to claim 1 further comprising means to convert said fiber laser's infrared fundamental radiation into a higher energy second harmonic.

4. The side pumped fiber laser device according to claim 1 further comprising means to convert said fiber laser's infrared fundamental radiation into visible illumination.

5. The side pumped fiber laser device according to claim 1 wherein the laser active substance is a rare earth element.

6. A side pumped fiber laser device comprising a multimode round core containing a laser active substance, a cladding surrounding said core and an outer coating surrounding said cladding, and further including at least one pump radiation source, and means to couple radiation from said radiation source to said core and cladding, wherein:

said fiber laser is wound to form at least one spring like coil having well defined separation between single bends;

said outer coating is partly polished to form a coupling surface adjacent to a pump edge on said cladding, without causing damage there to;

said pump radiation source is at least one inline set of high power diode lasers which simultaneously couple pump-radiation along said coil; and said means to couple said radiation from said radiation source is at least one optical system comprising micro-lenses which image each diode laser on to exactly one pump edge of said fiber laser coil.

7. A method to manufacture a side pumped fiber laser device from a fiber consisting of a multimode round core containing a laser active substance, and an inner cladding surrounding said core; at least one pump radiation source; and means to couple radiation from said pump radiation source into said core and inner cladding comprising the steps of:

a) winding said fiber laser to form a spring-like coil having well defined separation between single bends, b) polishing said cladding to form a coupling surface adjacent to a pump edge on said inner cladding, without causing damage thereto, c) attaching said means to couple pump radiation to said coupling surface, and d) repeating steps a, b and c at intervals along the length of a long fiber laser to produce additional fiber laser side-pumping devices if desired.

8. The method according to claim 7 wherein said pump radiation source is at least one inline set of high power diode lasers, which simultaneously provide pump-radiation along said coil.

9. The method according to claim 7 wherein said optical system is a least one micro-lens which images individual high power diode lasers on to exactly one pump edge of said fiber laser coil.

10. The method according to claim 7 further comprising a means to convert said fiber laser's infrared radiation into visible illumination.

11. The method according to claim 7 wherein said additional fiber laser side-pumping devices are spaced along the length of said fiber such that pump intensities from adjacent pumping devices will overlap to produce a uniform pump distribution and illumination along said fiber.

12. The method according to claim 7 further comprising the steps of:
 a') winding a substantial length of said fiber to form said spring-like coil;
 b') polishing said cladding along a substantial length of said coil to form said coupling surface; and
 c') attaching a single block of micro-lenses which covers the entire length of said coupling surface.

* * * * *